US008085692B2

(12) United States Patent
Vaught et al.

(10) Patent No.: US 8,085,692 B2
(45) Date of Patent: Dec. 27, 2011

(54) SYSTEM AND METHOD FOR CLICK-TO-JOIN AUDIO CONFERENCING

(75) Inventors: Terry Vaught, York, PA (US); Wayne Dugal, Dublin, OH (US); Mark Rowe, Logan, OH (US); Brian Johnson, Borger, TX (US); Don Angle, Orange Beach, AL (US)

(73) Assignee: Intelligent Voice Solutions, LLC., Dublin, OH (US)

( * ) Notice: Subject to any disclaimer, the term of this patent is extended or adjusted under 35 U.S.C. 154(b) by 1231 days.

(21) Appl. No.: 11/762,438

(22) Filed: Jun. 13, 2007

(65) Prior Publication Data

US 2007/0286388 A1 Dec. 13, 2007

Related U.S. Application Data

(60) Provisional application No. 60/813,180, filed on Jun. 13, 2006.

(51) Int. Cl.
*H04L 12/16* (2006.01)
(52) U.S. Cl. ........................................ 370/260; 370/261
(58) Field of Classification Search ........... 370/260–271
See application file for complete search history.

(56) References Cited

U.S. PATENT DOCUMENTS

| | | | | |
|---|---|---|---|---|
| 6,275,575 B1 * | 8/2001 | Wu | .......................... | 379/202.01 |
| 6,330,320 B1 * | 12/2001 | Cornell et al. | ........... | 379/202.01 |
| 7,298,834 B1 * | 11/2007 | Homeier et al. | ......... | 379/202.01 |
| 7,376,129 B2 * | 5/2008 | Acharya et al. | ............... | 370/352 |
| 7,660,849 B1 * | 2/2010 | Shaffer et al. | .................. | 709/204 |
| 7,804,948 B2 * | 9/2010 | Turner | ..................... | 379/204.01 |
| 7,813,305 B2 * | 10/2010 | Baker et al. | .................... | 370/261 |
| 2003/0005150 A1 * | 1/2003 | Thompson et al. | ........... | 709/238 |
| 2003/0023672 A1 * | 1/2003 | Vaysman | ...................... | 709/203 |
| 2003/0059003 A1 * | 3/2003 | Lewis | ......................... | 379/88.13 |
| 2003/0142635 A1 * | 7/2003 | Roher et al. | ................... | 370/260 |
| 2005/0069116 A1 * | 3/2005 | Murray, II | ................ | 379/202.01 |
| 2005/0213517 A1 * | 9/2005 | Rodman et al. | ............... | 370/260 |
| 2006/0010392 A1 * | 1/2006 | Noel et al. | ..................... | 715/759 |
| 2006/0149815 A1 * | 7/2006 | Spradling et al. | ............. | 709/205 |
| 2007/0049261 A1 * | 3/2007 | Joglekar | ........................ | 455/416 |
| 2007/0116225 A1 * | 5/2007 | Zhao et al. | ............... | 379/202.01 |

\* cited by examiner

*Primary Examiner* — Hong Cho
(74) *Attorney, Agent, or Firm* — Thomas, Kayden, Horstemeyer & Risley, LLP.

(57) ABSTRACT

Systems and methods for audio conferencing are described. At least one embodiment includes an audio-conferencing system comprising a web server configured to allow a host to select one or more individuals to receive invitations to participate in a conference call, the web server further configured to receive parameters associated with the conference call; an e-mail module configured to send e-mails to the one or more selected individuals, the e-mails configured to present an invitation to the one or more selected individuals to participate in the conference call, and wherein the e-mails include a link allowing the one or more individuals to click the link to accept the invitations to become participants; and a conference call server configured to receive a host identification from the host, the conference call server configured to receive a command from the web server to place calls to the one or more participants to initiate a conference call between the host and the participants.

24 Claims, 8 Drawing Sheets

SYSTEM AND METHOD FOR CLICK-TO-JOIN AUDIO CONFERENCING

CROSS-REFERENCE TO RELATED APPLICATION

This application claims priority to, and the benefit of, U.S. Provisional Patent Application entitled, "CLICK TO JOIN FUNCTION/FEATURE FOR AUDIO CONFERENCING," having Ser. No. 60/813,180, filed on Jun. 13, 2006, which is incorporated by reference in its entirety.

TECHNICAL FIELD

The present disclosure generally relates to call conferencing and, more particularly, relates to a system and method for click-to-join audio conferencing.

BACKGROUND

Over the years, audio conference calls have become a popular alternative to face-to-face meetings, particularly for participants who are geographically dispersed. Generally, conference calls may be conducted in a number of ways. In some instances where there are only two or three individuals, the individuals may simply conduct a conference call using three-way calling, a feature commonly available for many residential or commercial lines. One person will generally place a call to one of the individuals. Once that call is placed, the person may then place a second phone call (by pressing the flash button) to the third individual. This, however, requires coordination and planning beforehand as all the parties must be ready to receive the call in order to avoid unnecessary delay in conducting the conference call.

Conference calls may also be conducted wherein the participants simply dial into a pre-established conference call bridge at a designated time and then enter a passcode to join the call. One perceived shortcoming with this approach, however, is that individuals who are invited to participate on a conference call must first remember the phone number for dialing into the conference call. The individuals must also generally remember some type of passcode in order to join in the proper conference call. In many instances, the conference call number and the corresponding passcode are sent via e-mail. Understandably, this can sometimes present a challenge given the large number of e-mails that individuals may receive at work or at home on a daily basis.

Another perceived shortcoming is that the host (the person conducting the conference call) generally does not know who will be participating in the call unless the individuals each notify the host whether he will be participating in the conference call. Another perceived shortcoming is the fact that even though a time may be designated for the conference call, participants generally dial in at different times such that participants who dial in first must wait for the remaining participants to dial in before the conference call may be conducted. Therefore, a need exists in the industry to address these deficiencies and inadequacies.

SUMMARY

Briefly described, one embodiment, among others, includes an audio-conferencing system comprising a web server configured to allow a host to select one or more individuals to receive invitations to participate in a conference call, the web server further configured to receive parameters associated with the conference call; an e-mail module configured to send e-mails to the one or more selected individuals, the e-mails configured to present an invitation to the one or more selected individuals to participate in the conference call, and wherein the e-mails include a link allowing the one or more individuals to click the link to accept the invitations to become participants; and a conference call server configured to receive a host identification from the host, the conference call server configured to receive a command from the web server to place calls to the one or more participants to initiate a conference call between the host and the participants.

Another embodiment includes an audio conferencing system comprising means for selecting one or more individuals to receive invitations from a host to participate in a conference call; means for entering parameters associated with the conference call; means for sending e-mails to the one or more selected individuals, the e-mails configured to present invitations to the selected individuals to participate in the conference call, the e-mails including a link presented to the individuals; means for accepting the invitations such that the one or more individuals become participants, the one or more individuals accepting the invitations by clicking on the link; and means for placing calls to the participants to initiate the conference call between the host and the participants.

Yet another embodiment includes a method for audio-conferencing comprising selecting one or more individuals to receive invitations from a host to participate in a conference call; sending e-mails to the one or more selected individuals, the e-mails configured to present invitations to the selected individuals to participate in the conference call, the e-mails including a link presented to the individuals; accepting the invitations such that the one or more individuals become participants, the one or more individuals accepting the invitations by clicking on the link; and placing calls to the participants to initiate the conference call between the host and the participants.

Yet another embodiment includes a method for audio-conferencing comprising receiving one or more e-mails, the e-mails configured to present invitations to one or more individuals to participate in a conference call, the e-mails including a link presented to the one or more individuals; clicking on the links to accept the invitations such that the one or more individuals become participants; and receiving calls participate in the conference call with a host.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
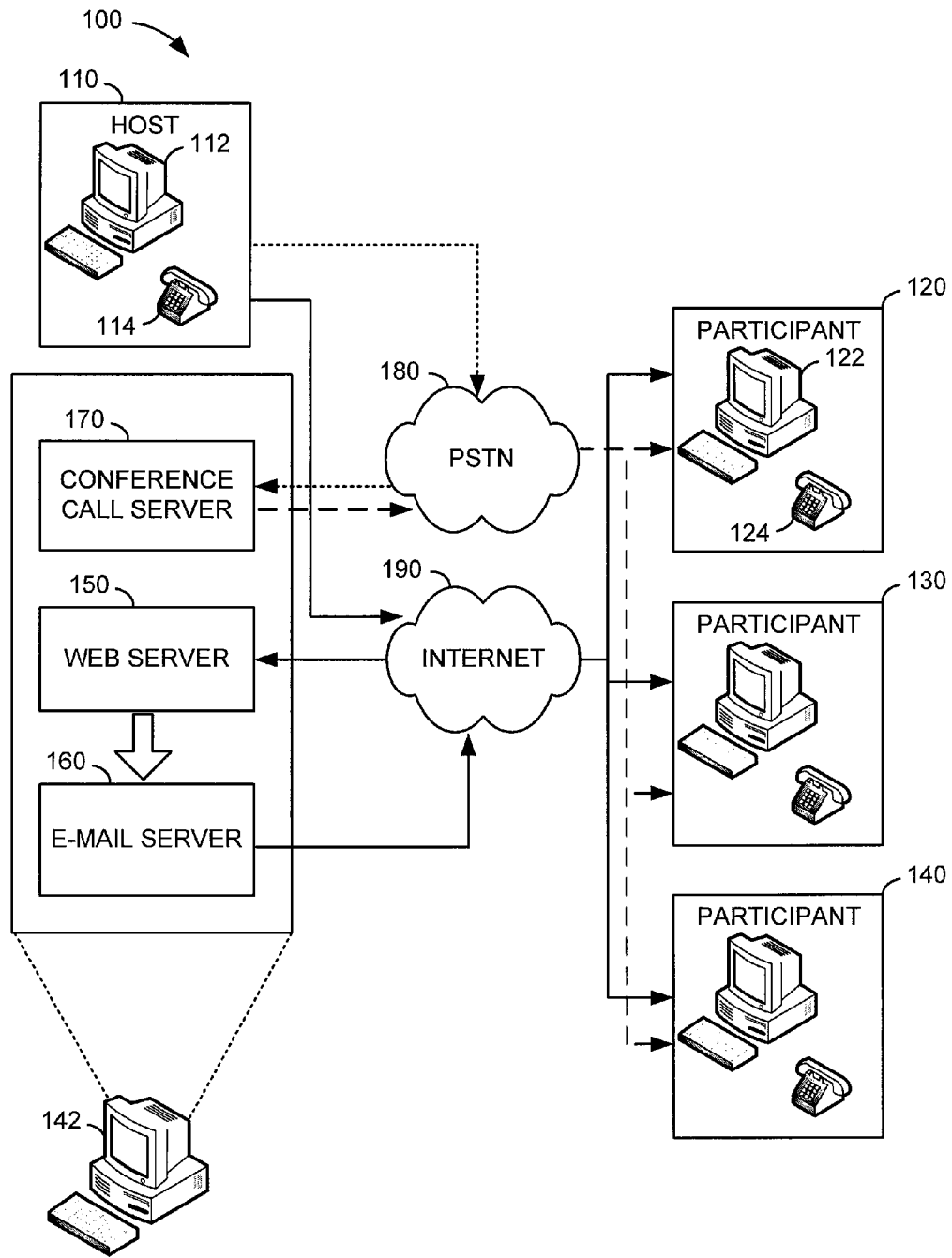
FIG. 1 depicts a top-level diagram for an embodiment of a system for audio conferencing.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed in the background, one apparent shortcoming found in conventional approaches for initiating conference calls is that individuals who are invited to participate on a conference call must remember the phone number for dialing into the conference call. Furthermore, the host (the person conducting the conference call) generally doesn't know who will be participating in the call unless the individuals each notify the host whether he will be participating in the conference call. Another perceived shortcoming is the fact that even though a time may be designated for the conference call, participants generally dial in at different times such that participants who dial in first must wait for the remaining participants to dial in before the conference call may be conducted.

Certain embodiments of systems and methods disclosed herein address these perceived shortcomings by automatically calling each of the participants in order to initiate a conference call such that the participants do not need to remember the phone number (or some type of passcode) in order to join in on a conference call. Furthermore, the wait time before the conference call actually begins is minimized. It should also be appreciated that the host will know beforehand who will be participating in the conference call. For purposes of nomenclature used herein, the term "host" generally refers to the individual or system initiating and conducting the conference call. The term "participants" will generally be used to refer to individuals who have received an invitation to join in on a conference call and who have accepted the invitation.

Reference is now made to FIG. 1, which depicts a top-level diagram for an embodiment of a system for audio conferencing. Exemplary embodiments for the audio conferencing system 142 may include a web server 150, an e-mail server 160, and a conference call server 170. The system may be communicatively coupled to a host 110 and a plurality of participants 120, 130, 140. Generally, the host 110 may comprise a computing system 112 such as a personal computer or laptop. The host 110 may further comprise a telephone 114 used for conducting the conference call. Likewise, each of the participants 120, 130, 140 may also comprise a computing system 122 and a telephone 124. The computing system 122 may be used by the individuals to receive invitations via e-mail and to accept (or decline) the invitation to join in the conference call.

The host 110 sets up a conference call by first interfacing with the web server 150. Through the web server 150, the host 110 specifies the contact information for the individuals who are to receive an invitation to join in a conference call. It should be noted that one or more individuals may be invited to join in the conference call. For some embodiments, the host 110 may be communicatively coupled to the web server 150 through a network environment 190 such as the Internet, for example. Upon receiving the parameters associated with the conference call, the web server 150 communicates with the e-mail server 160, which then sends an invitation e-mail to the one or more individuals. Again, the e-mail server 160 may communicate with the individuals through a network environment such as the Internet 190.

After the one or more individuals receive their invitation e-mails, the individuals then either accept or decline the invitation to participate in the conference call. The replies from each of the individuals are routed back to the web server 150, which then communicates to the conference call server 170 which individuals will be participants in the conference call. For some embodiments, the replies from each of the individuals may be encoded in order to ensure security so that third parties may not monitor or tamper with the information.

Upon receiving each of the replies, the web server 150 validates the information sent from the one or more individuals. This step is performed to further ensure security. To initiate the actual conference call, the host 110 places a telephone call to the conference call server 170 using the telephone 114. For some embodiments, the telephone call may be placed over the Public Switched Telephone Network (PSTN) 180 via a voice-grade telephone service such as POTS (plain old telephone service). In alternative embodiments, the telephone call may be performed utilizing Voice over Internet Protocol (VoIP) service, wherein the voice data is transported over the Internet 190 instead. It should be noted that many variations and modifications may be made to the above-described embodiments without departing substantially from the spirit and principles of this disclosure.

The conference call server 170 then places a telephone call to the one or more participants (i.e., individuals who accepted the invitation to join the conference call). The telephone calls are placed using each of the telephone numbers associated with the participants. In some embodiments, the participants, upon receiving the e-mail invitation, may confirm that the telephone number listed in the e-mail is accurate. The participants may alternatively enter a new telephone number. In some embodiments, when each participant answers the phone call, the participant may be prompted to enter in a security code to validate his or her identity. The security code may be included in the invitation e-mail.

Figure 2:
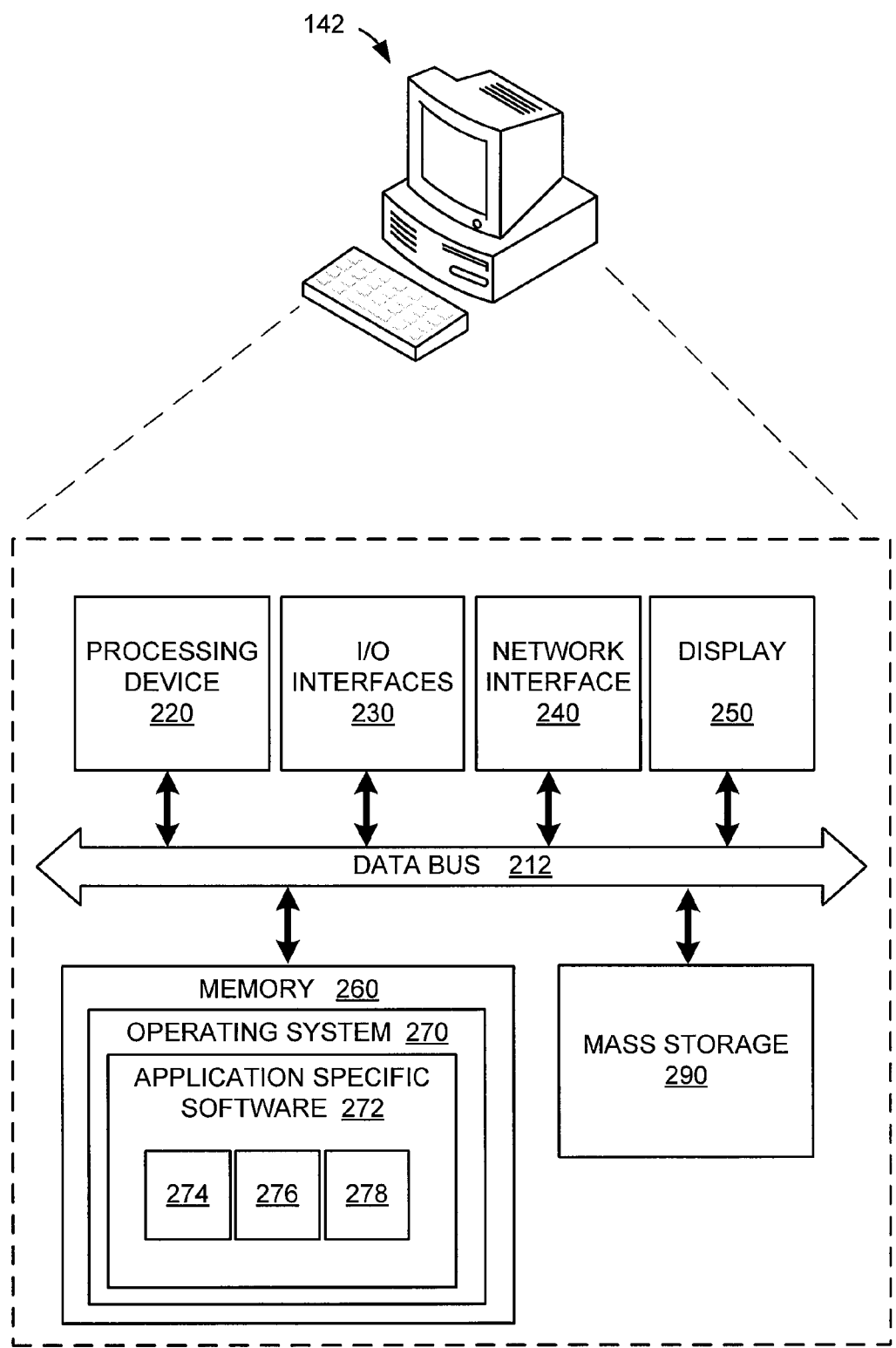
FIG. 2 is a block diagram illustrating an exemplary embodiment of the audio conferencing system in FIG. 1

Reference is now made to FIG. 2, which is a block diagram illustrating an exemplary embodiment of the audio conferencing system in FIG. 1. For some embodiments, the audio conferencing system described above may be incorporated in a computing device 142. Generally speaking, the computing device 142 may be any one of a wide variety of wired and/or wireless computing devices, such as a desktop computer, portable computer, dedicated server computer, multiprocessor computing device and so forth. Irrespective of its specific arrangement, the computing device 142 may comprise, among other components, a processing device 220, input/output interfaces 230, a network interface 240, and a display 250 connected across a data bus 212. One of ordinary skill in the art will appreciate that the computing device 142 can, and typically will, comprise other components, which have been omitted for purposes of brevity.

The display 250 can comprise a computer monitor or a plasma screen for a PC or a liquid crystal display (LCD), for example. The processing device 220 can include a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 260 shown in FIG. 2 can include any one of a combination of volatile memory elements (e.g., random-access memory RAM, such as DRAM, and SRAM, etc.) and nonvolatile memory elements (e.g., ROM, hard drive, tape, CDROM, etc.). The memory 260 may store a native operating system 270, one or more native applications, emulation systems, or emulated applications for any of a variety of operating systems and/or emulated hardware platforms, emulated operating systems, etc. For example, the applications may include an application specific program 272. Again, one of ordinary skill in the art will appreciate that the memory 260 can, and typically will, comprise other components, which have been omitted for purposes of brevity. The computing device 142 may further comprise mass storage 290. The mass storage 290 may be, for example, a disk drive, flash memory, or any other of a wide variety of storage devices capable of storing data.

The application specific software 272 shown in FIG. 2 may include the web server 274, e-mail server 276, and conference call server 278 described in FIG. 1. When the application specific software 272 is implemented in software, it should be noted that the application can be stored on a computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Input/output interfaces 230 comprise any number of interfaces for the input and output of data. For example, where the computing device 142 comprises a personal computer, the components within the system may interface with a user input device such as a keyboard or a mouse. The computing device 142 may also include a network interface 240 for transmitting and/or receiving data over a network. As a non-limiting example, the network interface 240 may include a modulator/demodulator (e.g., a modem), wireless (e.g., radio frequency (RF)) transceiver, a telephonic interface, a bridge, a router, network card, etc.

It should be noted that in alternative embodiments, the web server, e-mail server, and conference call server may reside in different systems. Furthermore, in some embodiments, the conference call server may be a call generator configured to originate and bridge telephone calls over the PSTN, such that the conference call server includes a POTS interface. The conference call server may further include a network interface for communicating with the web server.

Figure 3:
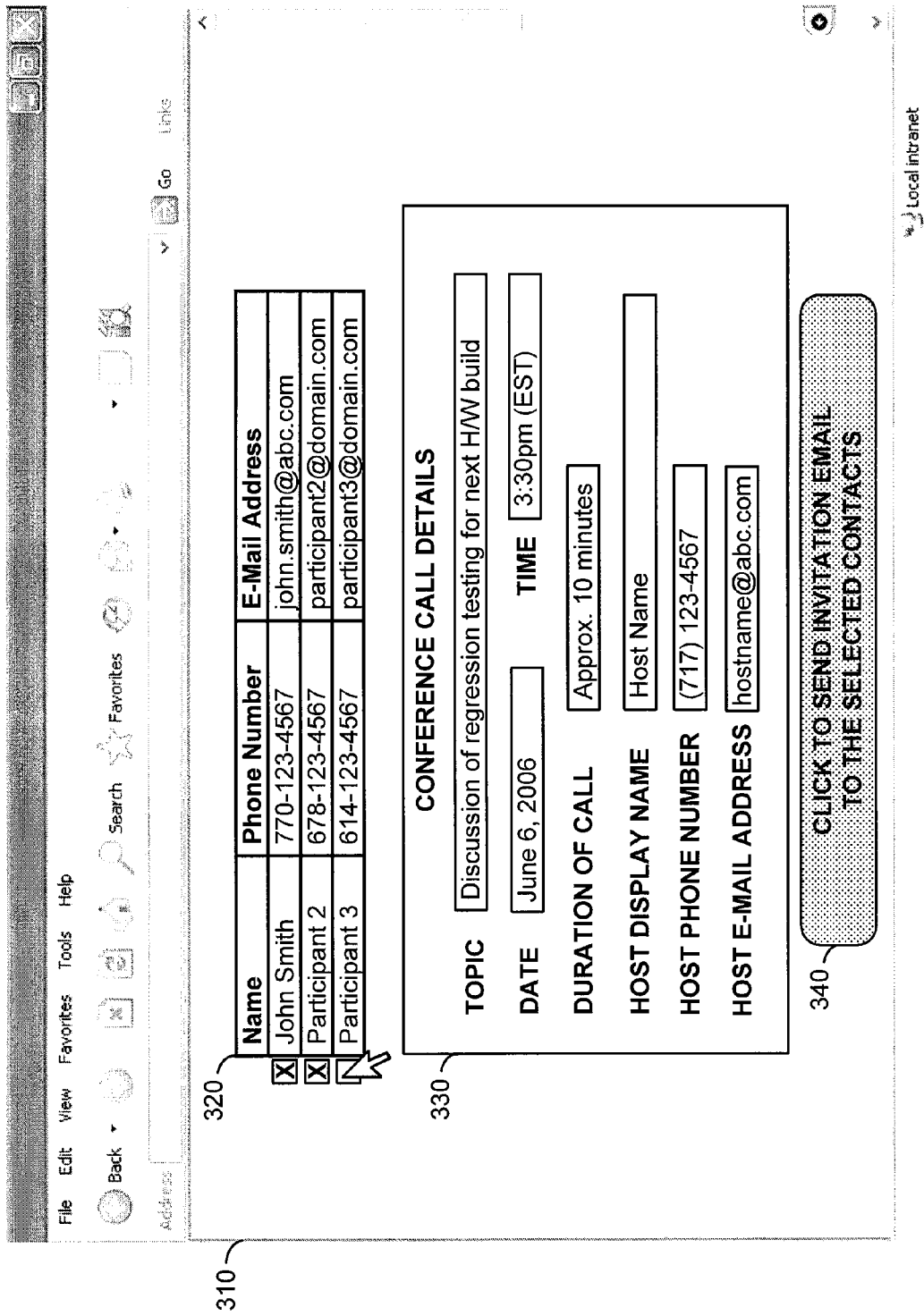
FIG. 3 is an exemplary embodiment of a web interface generated by the web server in FIG. 1 to receive parameters relating to a conference call.

Reference is now made to FIG. 3, which is an exemplary embodiment of a web interface generated by the web server in FIG. 1 to receive parameters relating to a conference call. As illustrated in the non-limiting example of FIG. 3, the web interface 310 may be provided to a host for specifying parameters for the conference call. More specifically, the web interface 310 may include a table 320 wherein the individuals to receive invitation e-mails are specified. The table 320 may include such information as the name of the individuals, phone numbers, and e-mail addresses associated with the individuals. In some embodiments, the list of prospective participants may be generated from a contacts list or some type of contacts management page. The host may then simply click on a checkbox beside each name to designate the contact as a prospective participant.

The non-limiting example of the web interface in FIG. 3 may also include a plurality of fields 330, which allows the host to input details associated with the conference call. As a non-limiting example, the conference call details may include the topic of the conference call, the date/time of the conference call, the expected duration of the conference call. In some embodiments, the host may further specify the display name that will be displayed to all the invitees of the conference call. The host may also input his or her phone number and e-mail address. Upon specifying all the prospective participants and entering all the conference call details, the host may then click on a button 340 to send an invitation e-mail to each of the selected individuals.

Figure 4:
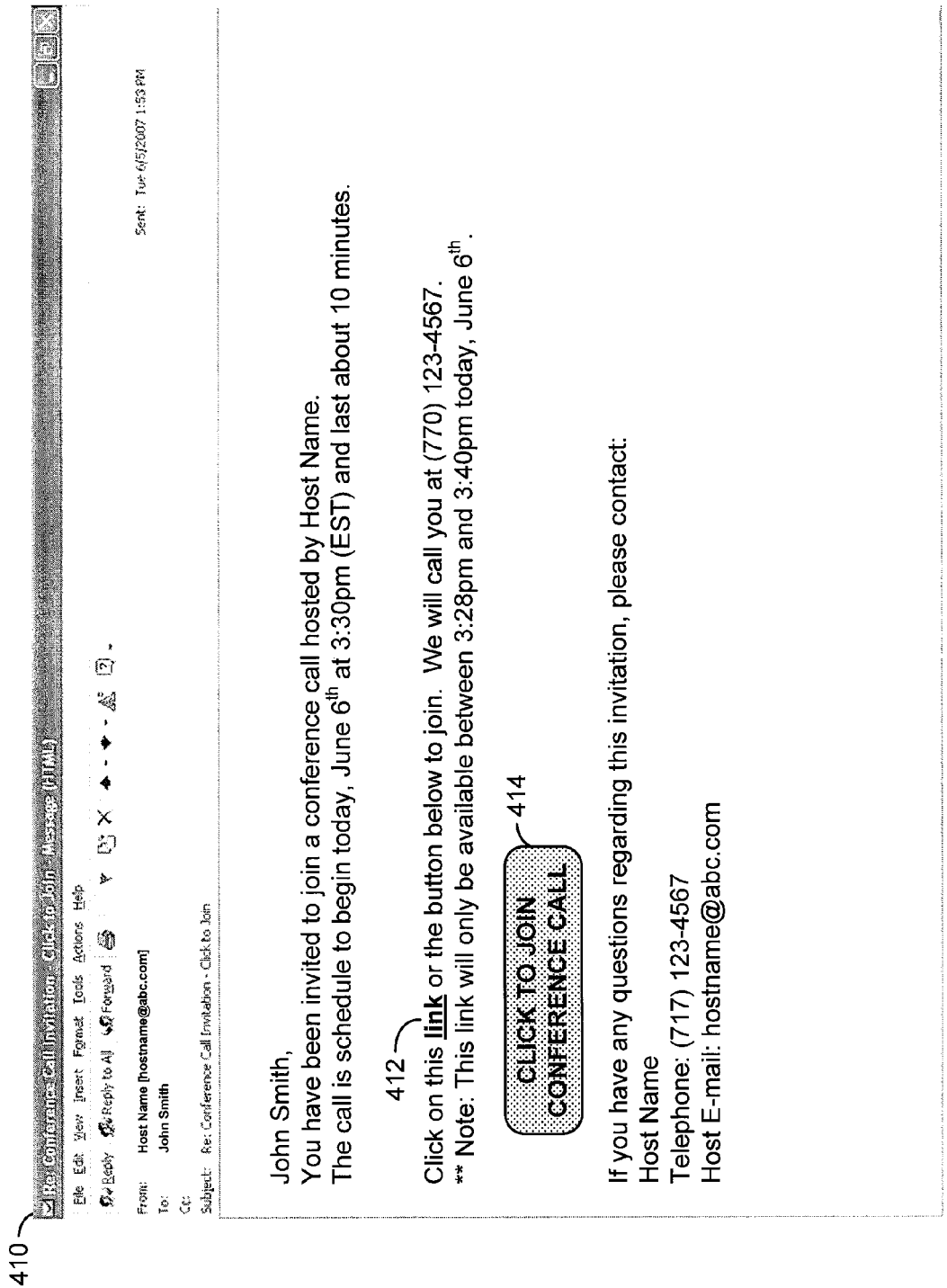
FIG. 4 is an exemplary embodiment of an invitation e-mail generated by the e-mail server in FIG. 1 configured to invite an individual to participate in a conference call.

FIG. 4 is an exemplary embodiment of an invitation e-mail that may be configured to invite an individual to participate in a conference call. After the host clicks on the button 340, an invitation e-mail is sent by the e-mail server to each of the selected individuals. In the non-limiting example shown in FIG. 4, the email 410 may include a generic greeting addressed to the individual. The greeting may specify the parameters entered by the host relating to the conference call, including the topic, date and time, and duration of the conference call. In the non-limiting example e-mail shown, the recipient of the e-mail may then click on a link 412 or a button 414 to accept the invitation to join in on the conference call. It should be noted that for exemplary embodiments of the invitation email, the link 412 (or button 414) will only remain active for a window of time. In the example shown, the link will only remain active between 3:28 pm and 3:40 pm as the conference call is scheduled for 3:30 pm. Once the conference call ends, the link expires.

Figure 5:
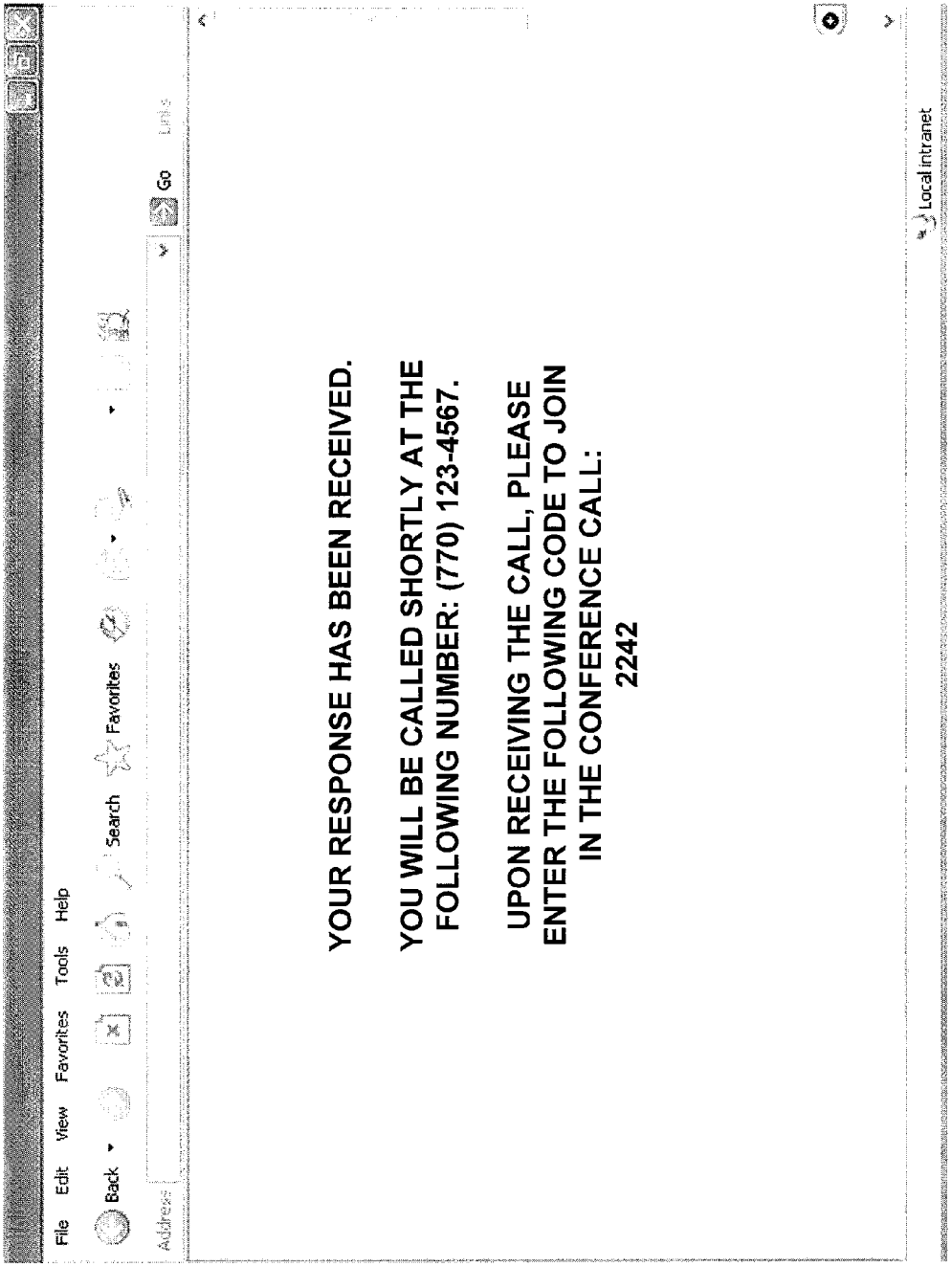
FIG. 5 is an exemplary embodiment of a web interface generated by the web server in FIG. 1 to provide a confirmation.

FIG. 5 is an exemplary embodiment of a web interface that provides a confirmation. Once an individual clicks on the link to accept an invitation to join in on a conference call, a web interface may be automatically displayed to the individual to indicate that the invitation was successfully accepted. In the non-limiting example shown in FIG. 5, the web interface may further indicate to the individual that the conference call will begin shortly and that a phone call will be made to the number listed for the individual. Finally, for some embodiments, the web interface may include a security code, which is entered by the participants to join in on the conference call.

Figure 6:
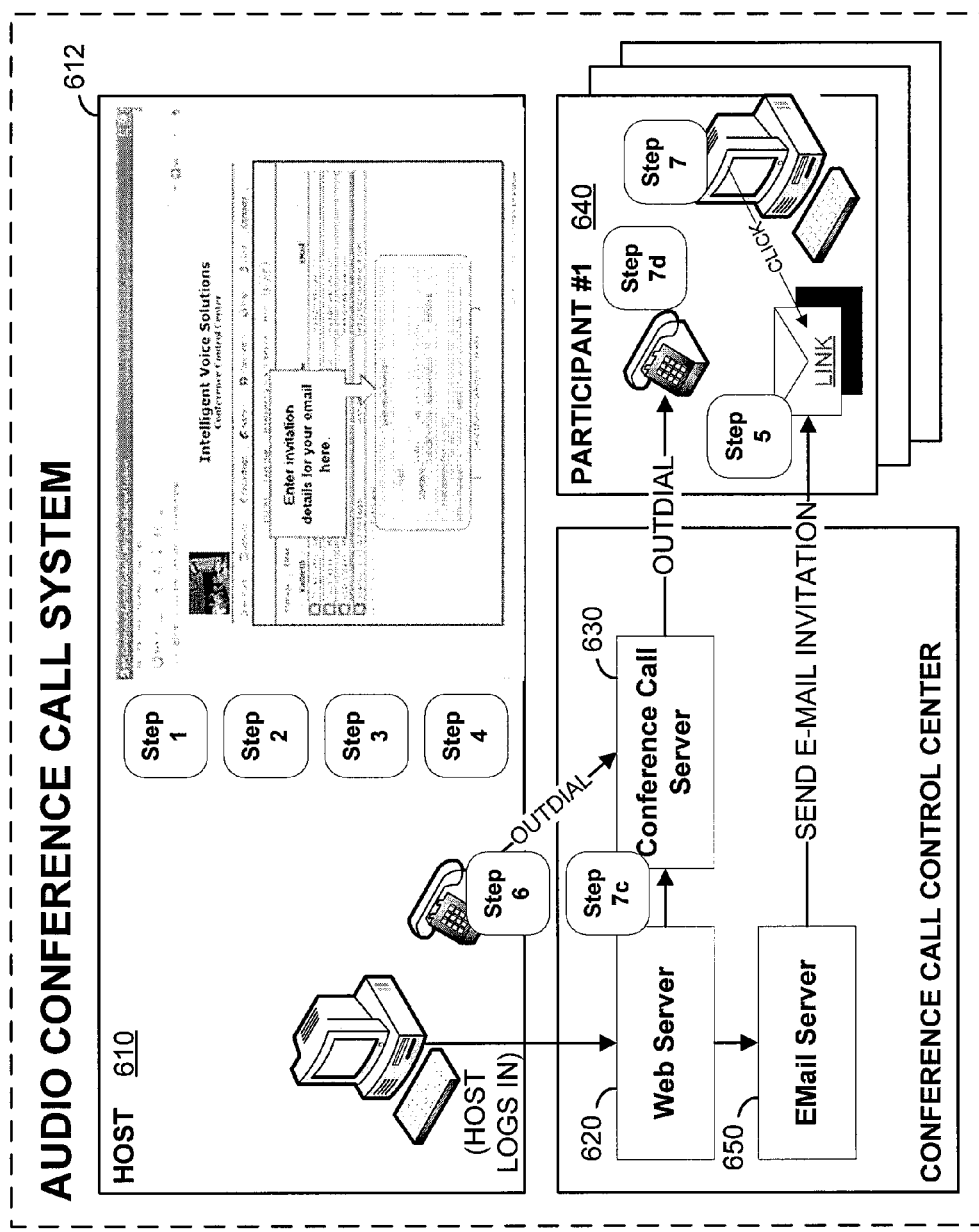
FIG. 6 depicts a top-level flow diagram for an embodiment of a system for audio conferencing depicted in FIG. 1.

FIG. 6 depicts a top-level flow diagram for an embodiment of a system for audio conferencing depicted in FIG. 1. In step 1, the host 610 first logs into the web server 620 to set up a conference call. Using a web interface similar to the one described in FIG. 3, the host 610 selects the prospective participants for the conference call (step 2). As described earlier, this may be performed using some type of contacts management page from which the host selects the participants 640 for the conference call. Using the web interface, the host provides such details as the conference call topic, starting time and call duration, and optionally, a security code in step 3. For some embodiments, this security code is later entered by each of the participants 640 in order to participate in the conference call.

In step 4, the host presses a link or button on the web interface and an invitation email is sent to every individual selected via the e-mail server 650. Each individual receives and reads the invitation email using their computing system (step 5). Next, in step 6, the host dials into the conference call server 630 to initiate the conference call. As described earlier, the conference call may take place over the PSTN. In some embodiments, the host may enter a conference ID and host ID. Upon validation of the conference ID and host ID, the links provided in the invitation emails are automatically activated. As described earlier, for some embodiments, the links may then remain active for a limited duration of time. For example, after the conference call ends, the link simply expires. In an alternative embodiment, the link may expire in the event that the host exits the conference call so that other participants cannot join the call without the host being present.

In step 7, as each recipient of an invitation email clicks on the provided link, the web server 620 will receive information associated with the link. For some embodiments, this information may be encoded to ensure security. The web server 620 then validates the information. Upon validation, the web server 620 sends interfaces with the conference call server 630 and commands conference call server 630 to place an outgoing call to each of the participants using the telephone number encoded in the information sent from each participant. For some embodiments, when the participants answer the phone calls, they are prompted to enter the security code provided in the email. Upon entering the correct security code, the participant is then placed into the conference call.

Figure 7:
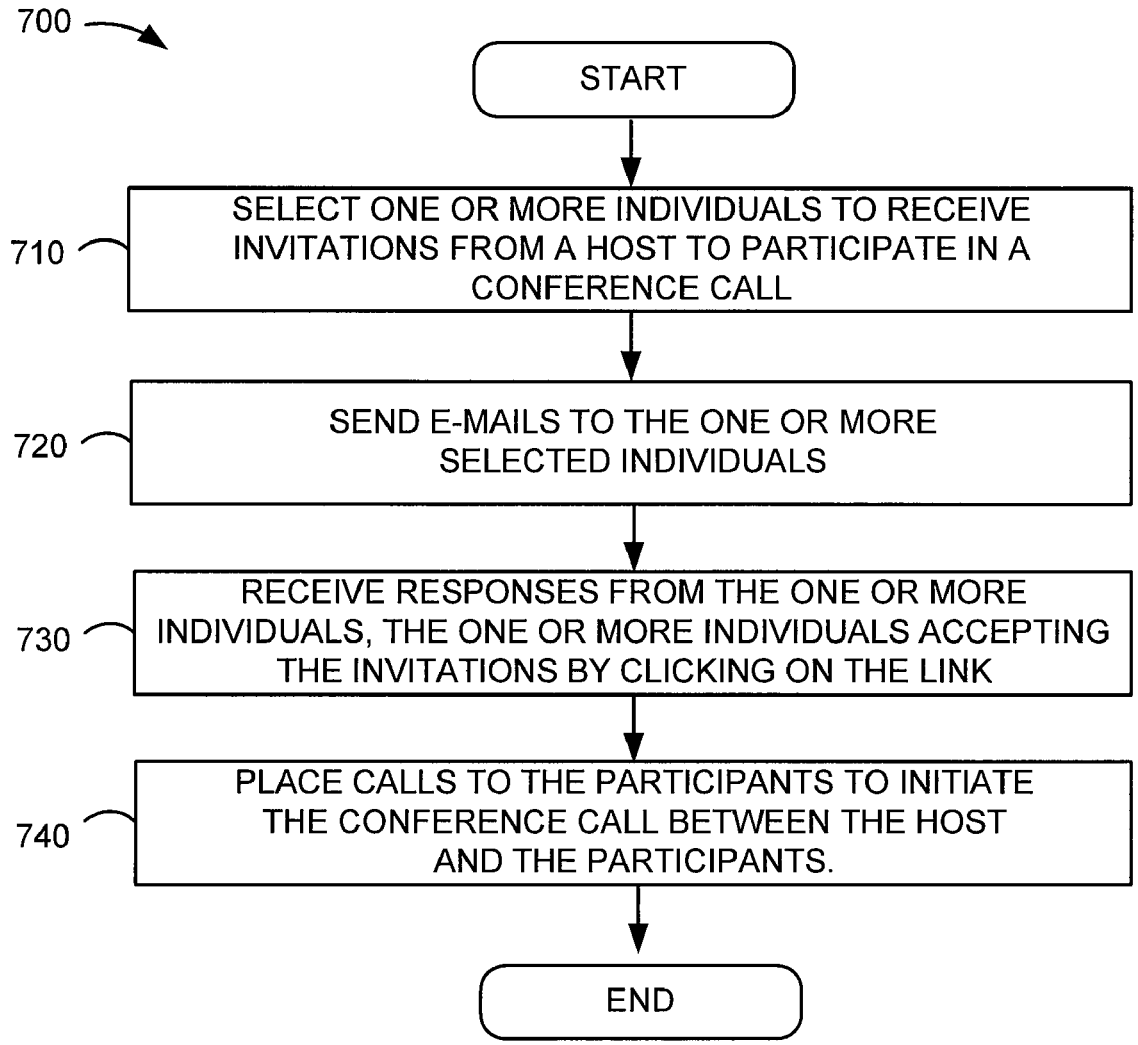
FIG. 7 depicts a flow diagram for an embodiment of a method for audio conferencing.

FIG. 7 depicts a flow diagram for an embodiment of a method for audio conferencing. For some embodiments, a method for audio-conferencing may comprise the following steps. First, in block 710, the host selects one or more individuals to receive invitations to participate in a conference call. Next, in block 720, e-mails are sent to the one or more selected individuals. The e-mails are configured to present invitations to the selected individuals to participate in the conference call. In exemplary embodiments, the e-mails include a link presented to the individuals. In block 730, responses are received from the one or more individuals, wherein the one or more individuals accept the invitations by clicking on the link. Finally, in block 740, calls are placed to the participants to conduct the conference call between the host and the participants.

Figure 8:
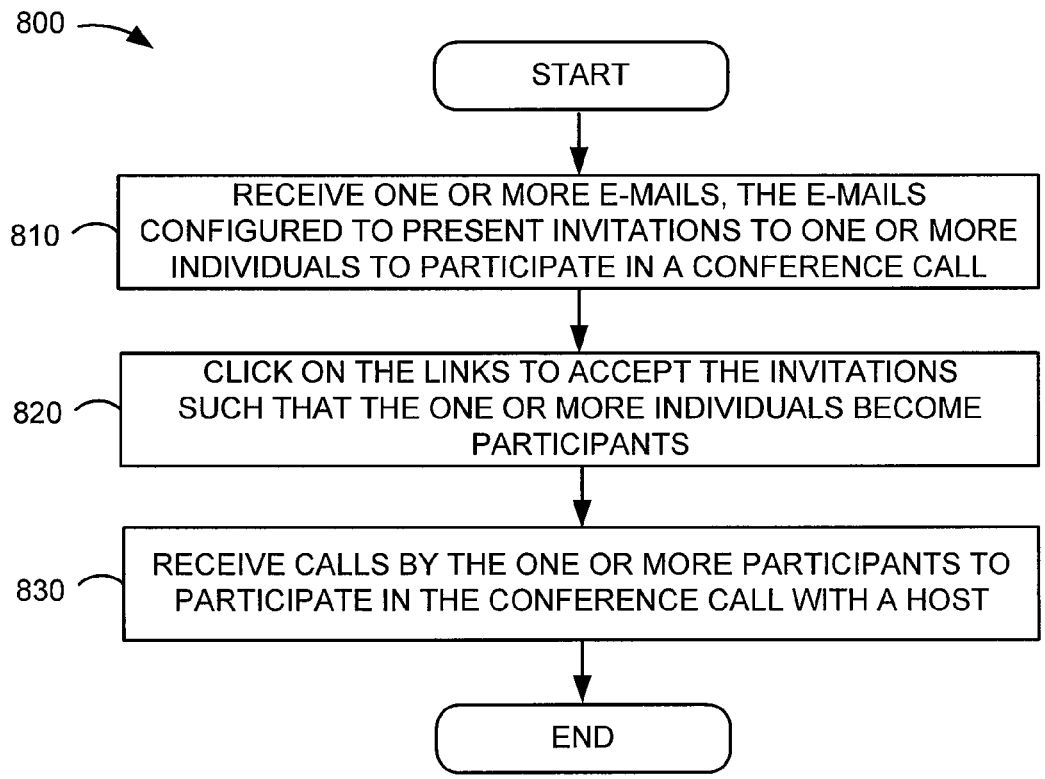
FIG. 8 depicts a flow diagram for an embodiment of a method for audio conferencing.

Reference is now made to FIG. 8, which depicts a flow diagram for an embodiment of a method for audio conferencing. First in block 810, one or more e-mails are sent to one or more individuals, wherein the e-mails are configured to present invitations to the one or more individuals to participate in a conference call. In exemplary embodiments, the e-mails include a link presented to the one or more individuals. Next in block 820, the individuals click on the links to accept the invitations such that the one or more individuals become participants. Finally, in block 830, the one or more participants receive calls to participate in the conference call with the host.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An audio conferencing system comprising:
   a web server configured to allow a host to select one or more individuals to receive invitations to participate in a conference call, the web server further configured to receive parameters associated with the conference call;
   an e-mail module configured to send e-mails to the one or more selected individuals, the e-mails configured to present an invitation to the one or more selected individuals to participate in the conference call, and wherein the e-mails include a link allowing the one or more individuals to click the link to accept the invitations to become participants; and
   a conference call server configured to receive a host identification from the host, the conference call server configured to receive a command from the web server to place calls to the one or more participants to initiate a conference call between the host and the participants based on the host identification.

2. The system of claim 1, wherein the parameters associated with the conference call comprises at least one of: a conference call topic, start time of the conference call, duration of the conference call, and a security code to be used by the participants to join the conference call.

3. The system of claim 1, wherein the web server receives encoded information corresponding to each of the individuals that click on the link, the web server further configured to validate the encoded information.

4. The system of claim 3, wherein the conference call server places a call to an individual only if the data corresponding to the individual is validated.

5. The system of claim 1, wherein the conference call server is further configured to prompt the participants for a security code after calling the participants, wherein the participants are allowed to join in the conference call only if the security code matches a predetermined code.

6. The system of claim 5, wherein the security code is included in the invitation presented to the selected individuals.

7. The system of claim 1, wherein the link is active during the conference call such that after the conference call ends the link is no longer available for individuals to click on the link to accept the invitations.

8. The system of claim 7, wherein the link is active only if the host is available such that if the host ceases to participate in the conference call, the link is no longer available for individuals to click on the link to accept the invitations.

9. The system of claim 1, the conference call server further configured to initiate the conference call only after receiving a call from the host.

10. An audio conferencing system comprising:
  means for selecting one or more individuals to receive invitations from a host to participate in a conference call;
  means for entering parameters associated with the conference call;
  means for sending e-mails to the one or more selected individuals, the e-mails configured to present invitations to the selected individuals to participate in the conference call, the e-mails including a link presented to the individuals;
  means for accepting the invitations such that the one or more individuals become participants, the one or more individuals accepting the invitations by clicking on the link; and
  means for placing calls to the participants to initiate the conference call between the host and the participants based on a host identification.

11. The system of claim 10, wherein the parameters associated with the conference call comprises at least one of: a conference call topic, start time of the conference call, duration of the conference call, and a security code to be used by the participants to join the conference call.

12. The system of claim 10, wherein the link is active during the conference call such that after the conference call ends the link is no longer available for individuals to click on the link to accept the invitations.

13. The system of claim 10, wherein the link is active only if the host is available such that if the host ceases to participate in the conference call, the link is no longer available for individuals to click on the link to accept the invitations.

14. A method for audio-conferencing comprising:
  selecting one or more individuals to receive invitations from a host to participate in a conference call;
  sending e-mails to the one or more selected individuals, the e-mails configured to present invitations to the selected individuals to participate in the conference call, the e-mails including a link presented to the individuals;
  receiving responses from the one or more individuals, the one or more individuals accepting the invitations by clicking on the link; and
  placing calls to the participants to conduct the conference call between the host and the participants based on a host identification.

15. The method of claim 14, further comprising: entering parameters associated with the conference call.

16. The method of claim 15, wherein the parameters associated with the conference call comprises at least one of: a conference call topic, start time of the conference call, duration of the conference call, and a security code to be used by the participants to join the conference call.

17. The method of claim 14, further comprising:
  receiving encoded information corresponding to each of the individuals that click on the link; and
  validating the encoded information.

18. The method of claim 17, wherein the step of placing calls to the participants further comprises: calling an individual only if the data corresponding to the individual is validated.

19. The method of claim 14, wherein initiating the conference call between the host and the participants further comprises:
  prompting each of the participants for a security code after calling the participants, wherein the participants are allowed to join in the conference call only if the security code matches a predetermined code.

20. The method of claim 19, wherein the security code is included in the invitation presented to the selected individuals.

21. The method of claim 14, wherein the link is active during the conference call such that after the conference call ends the link is no longer available for individuals to click on the link to accept the invitations.

22. The method of claim 14, wherein the link is active only if the host is available such that if the host ceases to participate in the conference call, the link is no longer available for individuals to click on the link to accept the invitations.

23. The method of claim 14, wherein placing calls to the participants to initiate the conference call occurs only after receiving a call from the host.

24. A method for audio-conferencing comprising:
  receiving one or more e-mails, the e-mails configured to present invitations to one or more individuals to participate in a conference call, the e-mails including a link presented to the one or more individuals;
  clicking on the links to accept the invitations such that the one or more individuals become participants; and
  receiving calls by the one or more participants to participate in the conference call with a host, wherein the calls to the one or more participants are initiated by the conference call server based on identification of a host.

* * * * *